(12) United States Patent
Lammers

(10) Patent No.: US 9,779,763 B1
(45) Date of Patent: Oct. 3, 2017

(54) WRITE SIGNAL ADJUSTMENT

(71) Applicant: Seagate Technology LLC, Cupertino, CA (US)

(72) Inventor: Todd M. Lammers, Lafayette, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/142,766

(22) Filed: Apr. 29, 2016

(51) Int. Cl.
*G11B 5/02* (2006.01)
*G11B 27/36* (2006.01)
*G11B 5/09* (2006.01)

(52) U.S. Cl.
CPC .................................... *G11B 5/09* (2013.01)

(58) Field of Classification Search
CPC ....... G11B 5/59633; G11B 5/58; G11B 5/012; G11B 27/36; G11B 20/10009; G11B 20/18; G11B 5/6005; G11B 5/59627
USPC ............ 360/25, 31, 39, 53, 75, 77.01, 77.06
See application file for complete search history.

(56) References Cited

U.S. PATENT DOCUMENTS

| | | | |
|---|---|---|---|
| 4,916,553 A | 4/1990 | Yoshioka et al. | |
| 4,964,107 A | 10/1990 | Galbraith et al. | |
| 6,337,778 B1 | 1/2002 | Gagne | |
| 6,621,648 B2 | 9/2003 | Elliott et al. | |
| 6,785,071 B2 | 8/2004 | Elliott et al. | |
| 6,826,003 B1 | 11/2004 | Subrahmanyam | |
| 7,830,631 B2 | 11/2010 | Nakagawa et al. | |
| 7,876,517 B2 | 1/2011 | Buch et al. | |
| 7,880,986 B1 | 2/2011 | Cheng | |
| 8,315,128 B1 | 11/2012 | Wilson et al. | |
| 8,358,478 B1 | 1/2013 | Cheng | |
| 8,599,508 B1 | 12/2013 | Burd | |
| 8,625,215 B1 | 1/2014 | Burd et al. | |
| 8,654,471 B2 * | 2/2014 | Springberg | G11B 5/012 360/55 |
| 8,687,300 B2 | 4/2014 | Ionescu | |
| 8,861,114 B1 | 10/2014 | Burd | |
| 8,885,275 B1 | 11/2014 | Lou et al. | |
| 8,885,277 B1 | 11/2014 | Erden et al. | |
| 8,891,207 B1 | 11/2014 | Li et al. | |
| 8,913,341 B1 | 12/2014 | Jury et al. | |
| 9,001,442 B2 | 4/2015 | Park et al. | |
| 9,099,103 B1 | 8/2015 | Krichevsky | |
| 9,099,155 B1 | 8/2015 | Kataria et al. | |
| 9,129,628 B1 | 9/2015 | Fallone et al. | |
| 9,159,360 B2 * | 10/2015 | Shiroishi | G11B 20/1217 |
| 9,245,578 B1 | 1/2016 | Wang et al. | |
| 9,275,656 B1 | 3/2016 | Contreras et al. | |
| 9,373,349 B1 | 6/2016 | Erden et al. | |
| 9,401,161 B1 | 7/2016 | Jury et al. | |

(Continued)

OTHER PUBLICATIONS

U.S. Appl. No. 14/094,235, filed Dec. 2, 2013, Trantham et al.

*Primary Examiner* — Nabil Hindi
(74) *Attorney, Agent, or Firm* — Mueting, Raasch & Gebhardt, P.A.

(57) ABSTRACT

A write signal may be adjusted, or modified, based on one or more read signals acquired, or read from, one or more portions proximate a target portion on a storage medium where the write signal is to be applied. The one or more read signals may be read from the storage medium in response to receiving a write data unit such that the read signals may not need to be buffered or later clock synchronized to the write signal.

20 Claims, 5 Drawing Sheets

(56) References Cited

U.S. PATENT DOCUMENTS

| | | |
|---|---|---|
| 9,570,104 B1 | 2/2017 | Erden et al. |
| 9,672,864 B2 | 6/2017 | Lammers et al. |
| 2003/0189778 A1 | 10/2003 | Elliott et al. |
| 2008/0158720 A1 | 7/2008 | Watson |
| 2010/0053787 A1 | 3/2010 | Mathew et al. |
| 2010/0053793 A1 | 3/2010 | Mathew et al. |
| 2010/0118433 A1 | 5/2010 | Buch |
| 2011/0080670 A1* | 4/2011 | Gubbins ............... B82Y 10/00 360/75 |
| 2012/0019947 A1 | 1/2012 | Kuehlwein et al. |
| 2012/0275278 A1 | 11/2012 | Wilson |
| 2013/0070362 A1 | 3/2013 | Mathew et al. |
| 2013/0083419 A1 | 4/2013 | Springberg et al. |
| 2013/0155826 A1 | 6/2013 | Zhang et al. |
| 2013/0182350 A1 | 7/2013 | Kawabe et al. |
| 2014/0126077 A1 | 5/2014 | Contreras et al. |
| 2014/0139940 A1 | 5/2014 | Ong et al. |

* cited by examiner

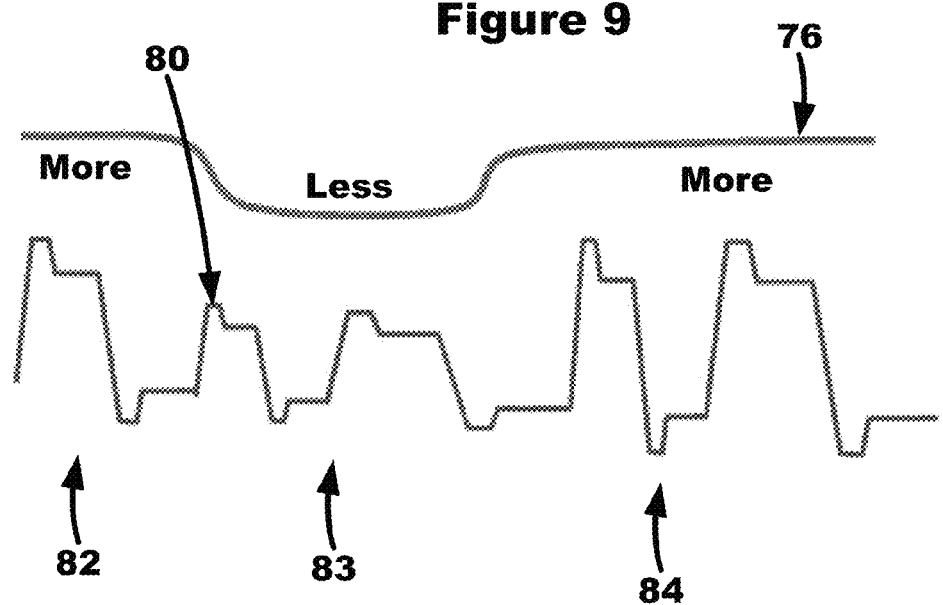
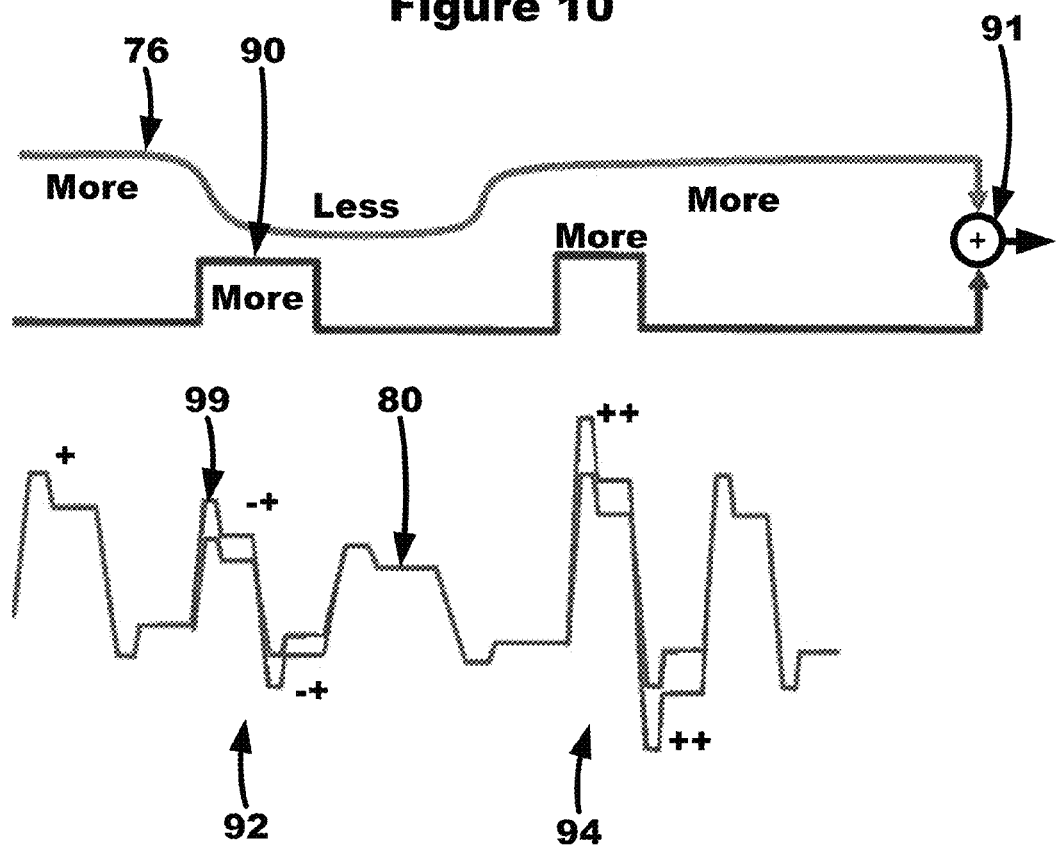

WRITE SIGNAL ADJUSTMENT

The disclosure herein relates to adjusting a write signal to compensate for existing magnetization of a storage medium.

SUMMARY

One exemplary device may include a storage medium, a head, and circuitry.

The storage medium may include a plurality of data tracks and the head may include a read transducer and a write transducer. The circuitry may be operably coupled to the head to read data from and write data to the plurality of data tracks of the storage medium. The circuitry may be configured to receive a write data unit to be written to a target portion of a target data track of the storage medium using the write transducer and acquire at least one read data signal from at least one of a target portion of the target data track and another portion of the target track or another data track proximate the target portion using the read transducer in response to receiving the write data unit. The circuitry may be further configured to adjust a write data signal corresponding to the write data unit based on the at least one read data signal to compensate for existing magnetization of the storage medium of the target portion or proximate the target portion of the target data track and transmit the adjusted write signal to the write transducer to write the write data unit to the target portion.

One exemplary method may include receiving a write data unit to be written to a target portion of a target data track of a storage medium of a storage device, reading at least one read data signal from at least one of a target portion of the target data track and another portion of the target track or another data track proximate the target portion in response to receiving the write data unit, adjusting a write data signal corresponding to the write data unit based on the at least one read data signal to compensate for existing magnetization of the storage medium of the target portion or proximate the target portion of the target data track, and writing the write data unit to the target portion based on the adjusted write signal.

In one or more embodiments, the circuitry may include a control processor and a preamplifier portion operably coupled to the control processor and the head. The preamplifier portion may be configured to adjust the write data signal corresponding to the write data unit based on the at least one read data signal to compensate for existing magnetization of the storage medium of or proximate the target portion of the target data track. In other words, adjusting a write data signal corresponding to the write data unit based on the at least one read data signal may be performed in a preamplifier portion of the storage device.

In one or more embodiments, the circuitry may include a preamplifier portion operably coupled to the head and a control processor operably coupled to the preamplifier portion. The control processor may be configured to adjust the write data signal corresponding to the write data unit based at least on the read data signal to compensate for existing magnetization of the storage medium of or proximate the target portion of the target data track. In other words, adjusting a write data signal corresponding to the write data unit based on the at least one read data signal may be performed in a control processor of the storage device.

In one or more embodiments, adjusting the write data signal corresponding to the write data unit based on the at least one read data signal may include creating a write modification signal based on the at least one read data signal and adjusting the write data signal in response to the write modification signal. Further, in one or more embodiments, creating a write modification signal based on the at least one read data signal may include delaying the at least one read data signal by a time interval corresponding to an amount of time that elapses from the read transducer being located over a selected point on the storage medium to when the write transducer is to be located over the selected point on the storage medium. Still further, in one or more embodiments, creating a write modification signal based on the at least one read data signal may include delaying the at least one read data signal by a time interval where, e.g., the time interval is based on at least a distance between the read transducer and the write transducer and a rotational speed of the storage medium. And still further, in one or more embodiments, creating a write modification signal based on the at least one read data signal may include delaying the at least one read data signal by a time interval where, e.g., the time interval may be adjusted based on latency between the head and the portion of the circuitry that is adjusting the write data signal corresponding to the write data unit based on the at least one read data signal. Yet still further, in one or more embodiments, creating a write modification signal based on the at least one read data signal may include one or more of rectifying the at least one read data signal, low-pass filtering the at least one read data signal, and calculating a moving average of the at least one read data signal. And yet still further, in one or more embodiments, the write modification signal may be based on a read data signal from the target portion of the target data track and another portion of another data track proximate the target portion.

One exemplary apparatus may include a storage medium comprising a plurality of data tracks and circuitry operably to read data from and write data to the plurality of data tracks of the storage medium. The circuitry may be configured to receive a write data unit to be written to a target portion of a target data track of the storage medium, determine a write modification signal based on at least one read data signal from at least one of a target portion of the target data track and another portion of the target track or another data track proximate the target portion in response to receiving the write data unit, and adjust a write data signal based on the write modification to compensate for existing magnetization of the storage medium of the target portion or proximate the target portion of the target data track. In one or more embodiments, the circuitry may be further configured to delay the modification signal by a time interval where, e.g., the time interval may be based on at least a distance between read and write transducers of a head configured read data from and write data to the storage medium.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

FIG. 9 is a graph depicting the write modification signal of FIG. 8 and a write data signal adjusted thereby.

FIG. 10 is a graph depicting the write modification signal of FIG. 8, an additional write modification signal, and a write data signal adjusted by the write modification signal of FIG. 8 and also the additional write modification signal.

DETAILED DESCRIPTION

Figure 1:
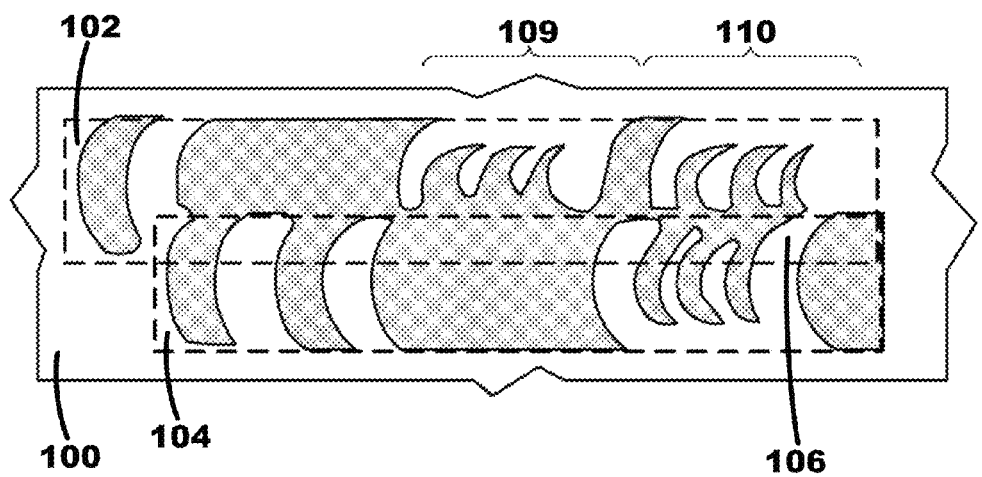
FIG. 1 is a graphical depiction of exemplary data tracks.

The present disclosure is related to systems, methods, and apparatuses utilizing magnetic recording media, e.g., hard disks. One advantage hard disk drives have over other data storage technologies (such as flash memory) may be relatively low cost-per-unit-of-storage, which may be achieved by, among other things, increasing the areal density of magnetic devices at a rate of about 10-15% over the last decade. This allows a disk drive device to increase total capacity without a significant increase in physical size or cost.

In order to maintain the growth of hard disk drive areal density, a number of new recording and reading technologies are proposed. For example, shingled magnetic recording (SMR), or other magnetic recording technologies, may write overlapping tracks resulting in a narrower tracks and higher track density. A technology known as two-dimensional magnetic recording (TDMR) allows reading two or more tracks at the same time, e.g., decoding a combination of the two tracks. Another technology known as multiple-sensor magnetic recording (MSMR), etc., utilizes multiple sensors per read/write head. A MSMR head can have multiple read transducers (e.g., readers) that read data from one or more tracks simultaneously, which may potentially increase performance for tracks written at a narrow pitch. It is to be understood that the terms "reader," "read transducer," and "read sensor" may be used interchangeably herein. Further, it is to be understood that the terms "writer," "write transducer," and "write sensor" may be used interchangeably herein. Additionally, colossal magnetoresistance (CMR) and various emerging perpendicular magnetic recording (PMR) technologies may further increase hard disk drive areal density.

Other magnetic recording technologies are being developed to address what is known as the paramagnetic limit, which may be described the theoretical areal density limit of existing perpendicular recording. Examples of these technologies may include heat-assisted magnetic recording (HAMR) and bit-patterned media (BPM). A HAMR recording device may use an energy source such as a laser to heat a spot on a high-coercivity medium to locally reduce coercivity during recording. After the spot has cooled, the data may be less susceptible to data loss due to thermal fluctuations. A BPM device may include a media that is patterned via nanolithography to form magnetic cells used to store bits of data. The use of nanolithography may allow for greater areal density than if the cells were defined in a continuous medium by a write transducer.

Whether areal density is increased using the various technologies described herein or any combination thereof, writing narrower tracks may present challenges. Not only are the written tracks narrower, but the spacing between tracks may be reduced. Further, magnetic interference, whether from tracks adjacent to a target track or from the target track itself, may be a concern. The exemplary systems, devices, apparatus, and methods may be described as being able to adjust write signals to compensate for such magnetic interference to, e.g., increase areal density, decrease read/write errors, etc. Further, the exemplary systems, devices, apparatus, and methods may be described as not using buffers or write synchronization clocks to adjust such write signals. Instead, it may be described that the write signals may be adjusted "on-the-fly" or "just-in-time" without the need for a buffer and/or write synchronization.

In other words, in present technologies such as, e.g., CMR, SMR, and PMR, the write process (e.g., specifically, including the application of a write current to a write transducer via a preamplifier) may not have any knowledge of existing pre-written data, neighboring track data, and erase bands on a storage medium. Without knowledge of adjacent or even previously-recorded on a data track, the write transducer on a head may struggle to record a track of interest with a decent signal-to-noise ratio (SNR) especially at a high data-rate. Additionally, in the applications of SMR and other magnetic recording technologies, where tracks may be intentionally overlapped, the de-magnetization contributions from specific bit combinations on neighboring tracks may be useful, or significant, to a writing, or recording, process for the track of interest. The exemplary systems, devices, apparatus, and methods described in this disclosure may modify, or adjust, a write signal (e.g., a write current) based on track data proximate (e.g., adjacent, near, in front, behind, etc.) a target portion of a target track without the use of a clock for write synchronization or a data buffer. Instead, the exemplary systems, devices, apparatus, and methods may be described as using "early feedback" provided by read sensors (e.g., read transducers on a head) to provide data and making decisions on how to write upcoming bits based on such data (e.g., increasing write current, etc.). Such "early feedback" may be referred to as being "early" because the feedback occurs before the write transducer passes over the target portion. For example, data from an element a selected distance (e.g., about 4 to 5 micrometers) ahead of a write transducer on a head may be used as feedback within a preamplifier to provide a signal, which may be transformed, or conditioned, (e.g., rectified, integrated, moving averaged, etc.) into a modification signal (e.g., an analog signal) that can be used to modify a write signal (e.g., a write current) that may then be used to write a write data unit to a target portion of a track of interest (TOI). In one or more embodiments, a programmable, or selectable, delay could be used to trim an exact "loop-back timing." For example, a total path delay from a read transducer to a preamplifier to a write transducer may be about 1 nanosecond while the amount of time that elapses between the read transducer being located over, and thus reading, a selected location of a storage medium to the write transducer being located over the same selected location may be greater than 1 nanosecond. Thus, a write modification signal may be delayed (e.g., time added, signal shifted, etc.) by the amount of time that elapses "between" the read transducer and the write transducer minus the total path delay.

Further, the read signal can be fed back to a control processor (e.g., controller, system-on-a-chip (SOC), etc.), which may be configured to determine, or make decisions on, what bits to modify by modifying a write signal (e.g., adjust or modify a write current amplitude, etc.). Again, a programmable, or selectable, delay could be used to trim an exact "loop-back timing." For example, a total path delay from a read transducer to a control processor (e.g., controller, system-on-a-chip (SOC), etc.) to a write transducer may be about 2-3 nanoseconds while the amount of time that elapses between the read transducer being located over, and thus reading, a selected location of a storage medium to the write transducer being located over the same selected location may be greater than 3 nanoseconds. Thus, a write modification signal may be delayed (e.g., time added, signal shifted, etc.) by the amount of time that elapses "between" the read transducer and the write transducer minus the total path delay. Further, the control processor may send this write modification signal (e.g., a digital amplitude modification signal) to the preamplifier, or preamp, for application to the write current for the track of interest. As noted herein, in MSMR and TDMR, on-and-off track read information may be used to enhance the ability to make write current decisions for the track of interest.

A graphical depiction of data tracks 102, 104 on a recording medium 100 are shown in FIG. 1. In this example, the tracks 102, 104 were written using SMR with the different shading representing different magnetic orientations of the medium 100. In this example, track 102 is the first track written, and track 104 is written second, overlapping the first track 102 by region 106, the region 106 being referred to herein as an erase band.

Two "downtrack" regions 109 & 110 of the tracks 102, 104 illustrate the effects that writing the second track 104 can have on the first track 102. For example, in region 109, a long transition for the second track 104 is aligned with shorter transitions on the first track 102, which may tend to distort the shorter transitions, e.g., when compared to similar transitions in region 110 on the first track 102. In embodiments described below, previously-written adjacent track data (e.g., as read, or sensed, by a read transducer) can be used to modify the writing of a track of interest to reduce magnetic interference between the adjacent track and the track of interest.

Exemplary systems, apparatus, devices, and methods shall be described with reference to FIGS. 1-10. It will be apparent to one skilled in the art that elements or processes from one embodiment may be used in combination with elements or processes of the other embodiments, and that the possible embodiments of such systems, apparatus, devices, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

The exemplary systems, apparatus, devices, and methods may provide adjustments, or modifications, to a write signal to compensate for existing magnetization of a storage medium as illustrated in FIG. 1. The adjustments, or modifications, to a write signal may include changing waveform asymmetry (e.g., difference between negative and positive peaks relative to zero), peak current, rise time, total current, overshoot, or any other parameter to compensate for existing magnetization (e.g., counteract erase band signatures, decrease curvature, increase saturation, decrease transition noise, etc.).

In some embodiments, the adjustments or modifications to a write signal may be helpful not only to the track of interest being written but also to the adjacent tracks. For example, the adjustments or modifications to a write signal may be designed to reduce interference at the adjacent tracks, which may ensure beneficial overwrite for the next track. For example, if the adjacent track is likely to have strong demagnetization, the write parameters (e.g., overshoot) can be adjusted such that applied magnetic field may effectively affect the media demagnetization, which may reduce transition shifts, etc. In other words, the write signal for a data pattern of the track of interest can be adjusted such that the recording field does not disturb (or better yet enhance) the data pattern on the adjacent tracks. Additionally, the track of interest may be recorded with a greater fidelity and may achieve a better signal-to-noise ratio if the write signal is adjusted, or modified, based on, or in response to, knowledge of the recorded pattern surrounding the track of interest and/or the recorded pattern previously on the track of interest. In this way, erase bands can be mitigated and both tracks-per-inch (track density) and bits-per-inch (linear bit density) can be increased resulting in a net areal density increase.

Figure 2:
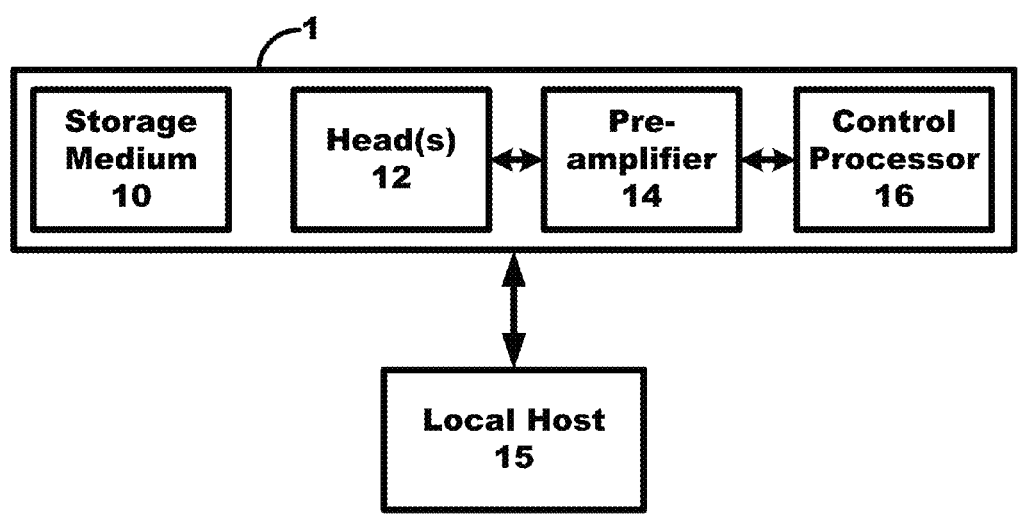
FIG. 2 is a block diagram including an exemplary storage device and local host.

An exemplary device 1 (e.g., data device) that can be used in the embodiments described herein is depicted in FIG. 2. The exemplary device 1 may be operably coupled to a local host 15, e.g., for transferring data therebetween, as shown in FIG. 2. For example, the local host 15 may request data from the device 1 and the device 1 may provide such requested data to the local host 15. Further, for example, the local host 15 may request to write data to the device 1 and the device 1 may write or store such data. In at least one embodiment, the local host 15 is a computer (such as, e.g., a personal computer, server, etc.). The device 1 includes a storage medium 10, one or more heads 12, a preamplifier portion, or preamplifier, 14, and a control processor, or controller, 16. The one or more heads 12, the preamplifier portion 14, and the control processor 16 may be operably coupled (e.g., electrically coupled to transmit data therebetween) to each other so as to read data from the storage medium 10 and write data to the storage medium 10. More specifically, although not shown but represented by the double-sided arrows, the device 1 may include a flex assembly and electrical traces to provide electrical connection paths between the heads 12, the preamplifier portion 14, and the control processor 16, and may further include any other devices or apparatus used to read data from and write data to the storage medium such as, e.g., a head actuator assembly, voice-coil motor, etc. Further, the flex assembly may include a printed circuit board that may, e.g., include circuitry for controlling the write currents applied to the one or more heads 12 during a write operation. The preamplifier portion 14, which may be generally described as being configured to bias and amplify read/write signals, may be coupled to the flex assembly.

The systems, apparatus, devices, and methods disclosed herein may be generally described in the context of exemplary device 1 and/or systems including exemplary device 1, but that should in no way be taken as limiting the scope of the present disclosure. Generally, a device 1 may be any device and/or apparatus in which data may be written to the storage medium 10 and then read back from the storage medium 10.

An exemplary storage medium 10 may be any device and/or apparatus configured to store a plurality of data tracks, or tracks of data, (e.g., binary data, etc.). Each data track may contain a plurality of data units, or sectors of data. The storage medium 10 can include, but is not necessarily limited to, solid state memory, hard magnetic discs, magnetic tapes, optical discs, integrated circuits, volatile memory, nonvolatile memory, and any combination thereof.

Further, a write data path (or outbound path) and a read data path (or inbound path) may be defined as extending through each of the control processor 16, the preamplifier portion 14, and the heads 12. Each of the write data path and the read data path may include one or more electrical conductors/connections to complete a circuit from the control processor 16 to a write transducer and a read transducer of each of the one or more heads 12, respectively. Generally, the write data path may be used to write data to a storage medium 10 or otherwise transmit communication to a downstream system. For example, write data may be received by the control processor 16 and transmitted from the control processor 16 along the write data path (e.g., through a flexible circuit and printed circuit board) to the preamplifier portion 14, and to (e.g., through an interconnection portion) a head 12 to be written to a storage medium using a write transducer located in, or on, the head 12. Likewise, read data may be read by a read transducer located in, or on, a head 12 and transmitted along the read data path (e.g., through an interconnection portion) to the preamplifier portion 14, and to (e.g., through a flexible circuit and printed circuit board) the control processor 16.

The control processor, or controller, 16 can be a printed circuit board and/or integrated circuit containing various circuitry, logic, and memory for use in the control of the storage device 1 and may further include any combination of custom logic circuits, application specific integrated circuits (ASICs), general-purpose central processing unit (CPU), interface circuits, and may utilize instructions stored as firmware and/or software. The control processor 16 may be generally described as being able to communicate with one or more read/write heads 12. The control processor 16 may be configured to, among other things, determine a location on the storage medium 10 for data to be stored or retrieved, move the heads 12 to the location (track) of the data, read data from or write data to the storage medium, correct errors, transfer the data to/from the host 15, etc.

Each of the heads 12 may include one or more read transducers and one or more write transducers. The read transducers may be configured to read a single data track or multiple data tracks of a storage medium simultaneously or at the same time. Likewise, the write transducers may be configured to write a single data track or multiple data tracks of a storage medium simultaneously or at the same time. The read transducers, or at least one read transducer, of the heads 12 may be described as being located forward, or before, the write transducers of the heads 12 such that, e.g., the read transducers, or the at least one read transducer, is located over, or passes over, a selected point of the storage medium 10 prior than the write transducers. In other words, at least one read transducer may be described as being located closer to a front, or forward portion, of the heads 12 than the write transducers. In this way, at least one or all of the read transducers may be able to read data, or signals representative of data, from the storage medium prior to the write transducers being located over the same spot, or location, on the storage medium. Further, it may be described that the read transducers may "read ahead" of the write transducers.

Additionally, a distance may extend between the read transducers and the write transducer (or at least one read transducer and at least one write transducer). For example, the downtrack distance between a read transducer and a write transducer may be between about 0.5 micrometers to about 10 micrometers. In at least one embodiment, the distance between a read transducer and a write transducer is about 4 micrometers. In one or more embodiments, the distance between a read transducer and a write transducer may be greater than or equal to about 0.5 micrometers, greater than or equal to about 1 micrometer, greater than or equal to about 1.5 micrometers, greater than or equal to about 2 micrometers, greater than or equal to about 2.5 micrometers, greater than or equal to about 3 micrometers, greater than or equal to about 3.5 micrometers, greater than or equal to about 4 micrometers, greater than or equal to about 4.25 micrometers, etc. and/or less than or equal to about 10 micrometers, less than or equal to about 8 micrometer, less than or equal to about 6 micrometers, less than or equal to about 5.5 micrometers, less than or equal to about 5 micrometers, less than or equal to about 4.75 micrometers, less than or equal to about 4.25 micrometers, less than or equal to about 3.75 micrometers, less than or equal to about 3.25 micrometers, less than or equal to about 2.75 micrometers, etc.

Figure 3:
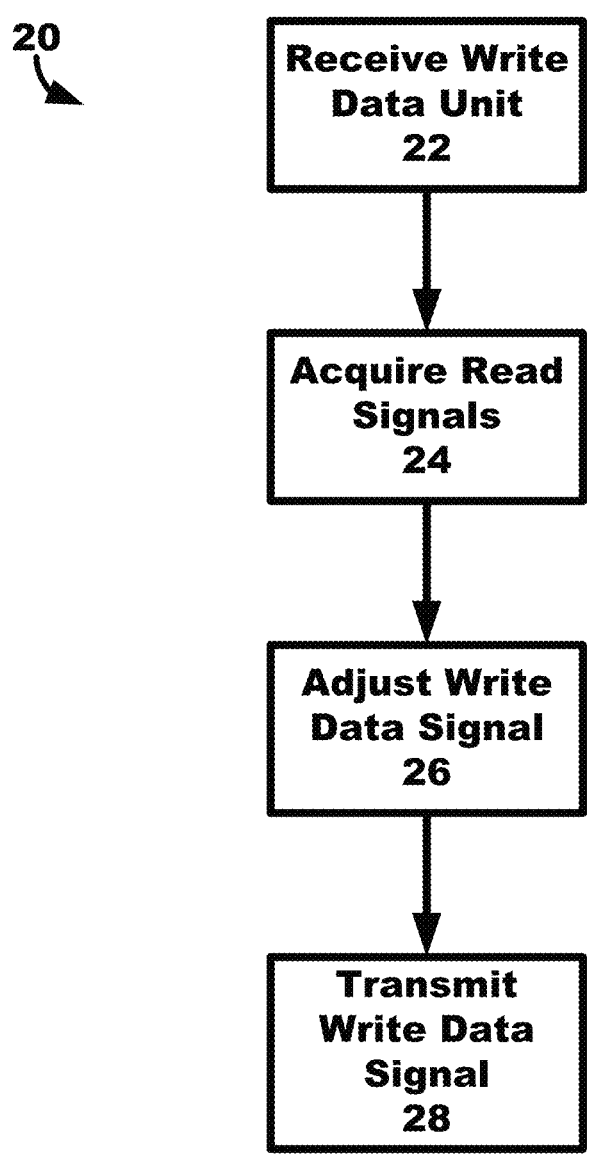
FIG. 3 is a block diagram depicting an exemplary method, or process, of write signal adjustment.

Generally, the exemplary systems, apparatus, devices, and methods may be described as including the following method 20 depicted in FIG. 3. First, a write data unit to be written to a target portion of a target data track of a storage medium of a storage device, such as storage device 1 depicted in FIG. 2, may be received 22, e.g., by either the preamplifier portion 14 via the control processor 16 or the controller processor 16 from the local host 15. In response to the write data unit being received 22, one or more read data signals may be acquired, or read, from one or more portions of the storage medium proximate, or near, the target portion of the target track 24. For example, a read signal may be read from a data portion located before or after the target portion of the target data track 24. Further, for example, a read signal may be read from a data portion on another track adjacent the target portion of the target track 24. Still further, for example, a read signal may be read from at least some, or all, of the target portion 24. In other words, it may be described that any portion of the storage medium that is relatively close to the target portion may be read to provide one or more, or a plurality, of read data signals that may be further used by method 20.

Additionally, it is to be understood that the one or more read data signals may be obtained, or gathered, from the storage medium only after a write data unit has been received 22, e.g., such the locations of the portions to be read are known, so as to not buffer unneeded data from portions not located proximate the target portion, etc. Further, it may described that the read data signals are measured, or read, "on-the-fly" because the read data signals are measured, or read, in direct response to reception of the write data unit (e.g., not as part of a buffering system, etc.). In other words, the step or process 24 may be described as being triggered, or initiated, in response to receiving the write data unit (which, e.g., is different from systems or devices that may continually-cache read data signals for later use with write signals).

Then, a write data signal corresponding to the write data unit may be adjusted, or modified, 26 based on the read data signals to compensate for existing magnetization of the storage medium of the target portion or proximate the target portion of the target data track and the write data unit may be transmitted, or sent, 28 to the head 12 to be written to the target portion.

Further, it may be described that the method 20, and processes contained therein, may be continually looping or being performed when writing data to a storage medium. In other words, the method 20 may be continually looking-ahead and adjusting the write data signal based on the acquired read data signal when writing. In one or more embodiments, the method 20 may be a feature of a storage device that may be enabled or disabled. When enabled, the method 20 may be performed in response to, or triggered by, reception of a write data unit, and when disabled, the method 20 may not be performed.

Figure 4:
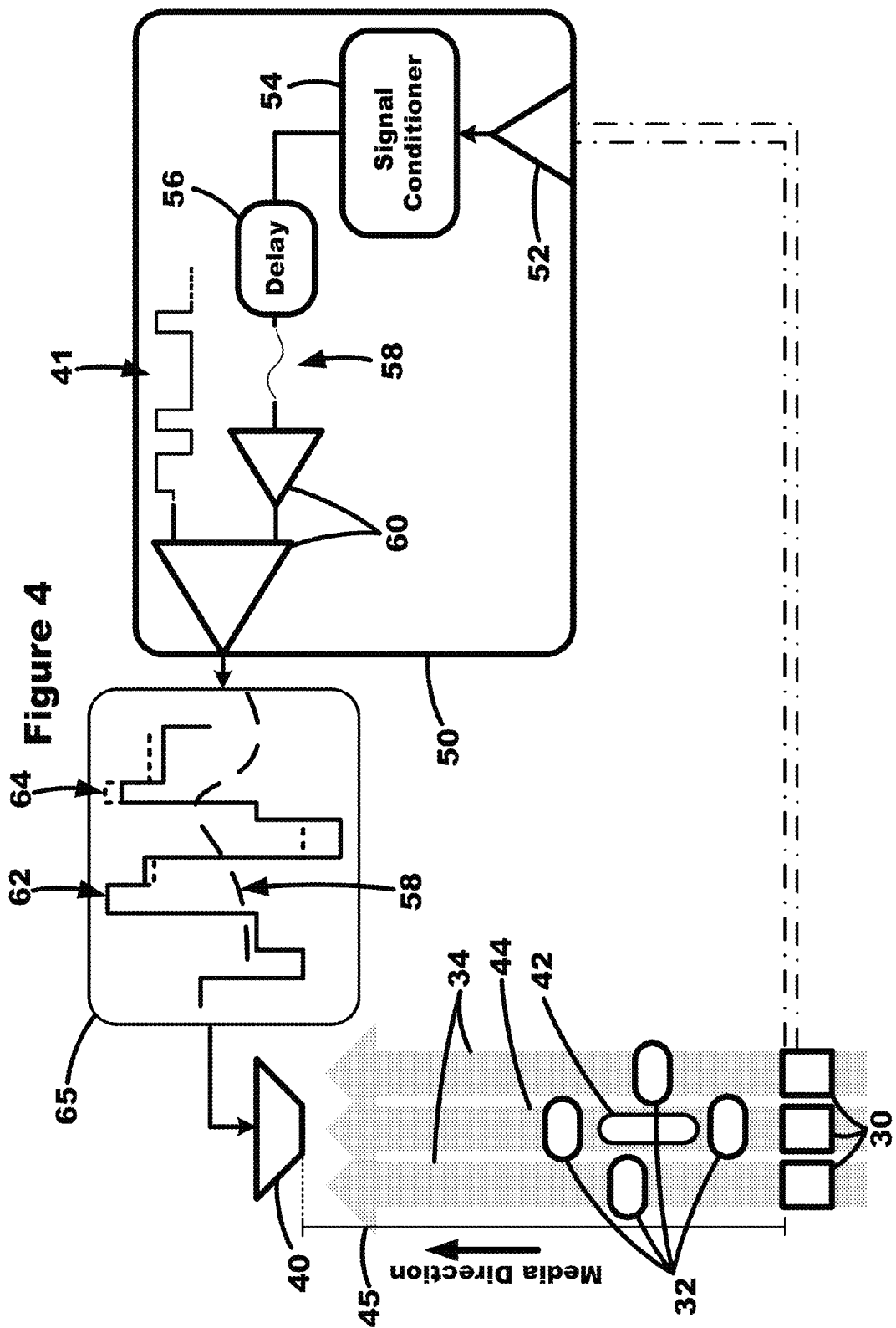
FIG. 4 is a diagram of exemplary apparatus adjusting a write data signal based on one or more read data signals.

A diagram of exemplary apparatus configured to adjust a write data signal based on one or more read data signals similar to the method shown in FIG. 3 is depicted in FIG. 4. As shown, one or more read transducers 30 may sense, or read, read data 32 from one or more adjacent tracks 34 and a target data track 44 of a storage medium before, or ahead, of a write transducer 40 in response to a write data unit 41 (e.g., the write data signal unit 41 may be represented by a binary, or logic, signal) being received to be written to a target portion 42 of the target data track 44. In essence, the read transducers 30 may sense read data 32 proximate (e.g., adjacent, ahead, behind, etc.) the target portion 42 of the target data track 44 after the write data unit 41 is received such that the locations where the read data 32 is to be read from are known (e.g., proximate or near the target portion 42 of the target data track 44). As shown, the read data 32 is sensed using the read transducers 30 from one or more tracks 32 before the write transducer 40 is located over the target portion 42. As described herein, a distance 45 may be associated, or defined between, the read transducers 30 and the write transducer 40, which may be about 4 micrometers.

In this embodiment, the read data, 32 is transmitted from the read transducers 30 to an exemplary preamplifier portion 50 as shown by the dashed lines. The read data 32 may be referred to as "read ahead data" because the read data 32 is read, or sensed, by the read transducers 30 "ahead" of the write transducer 40. In other words, the same location on the storage medium may pass the read transducers 30 ahead of, or before, the write transducer 40 passes the same location on the storage medium. The preamplifier portion 50 may receive and amplify and/or combine the read data 32 using one or more exemplary circuits and/or analog/digital devices. For example, as shown, the read data 32 may be generally described as being received by an amplifier 52, and then transmitted to a signal conditioner 54 for signal conditioning and manipulation, as will be described in further detail herein with respect to FIGS. 5-10. It is be understood that multiple combinations of hardware and software may be used to perform the functionality described herein with respect to FIGS. 5-10, and the elements depicted in FIG. 4 are only one exemplary embodiment.

Since the read data 32 may be used, or potentially used, to adjust a write signal 62 based on the write data unit 41 that is to be written when the write transducer 40 is located over a target portion 42 that is near where the read data 32 is read from and the total round trip delay from the read transducers 30 to the preamplifier portion 50 and then to the write transducer 40 may be less than an amount of time that elapses from the read transducer 30 being located over a selected point on the storage medium to when the write transducer 40 is to be located over the same selected point, a delay 56 may be added (e.g., by a discrete circuit or any other electronic apparatus) to the read data 32 or signal which is created, or derived therefrom, which may be referred to as a write modification signal. In other words, the signal based on the read data 32 may be delayed 56 to compensate for the amount of time "between" the read transducers 30 and the write transducer 40 (e.g., the time that elapses from when the read transducers 30 are located over a selected point of the storage medium to when the write transducer 40 is located over the selected point).

In at least one embodiment, a total path delay from the read transducer 30 to the preamplifier portion 50 to the write transducer 40 may be about 1 nanosecond. Further, the total path delay from the read transducer 30 to the preamplifier portion 50 to the write transducer 40 may, however, be between about 0.2 nanoseconds to about 5 nanoseconds. For example, the total path delay from the read transducer 30 to the preamplifier portion 50 to the write transducer 40 may be greater than or equal to about 0.2 nanoseconds, greater than or equal to about 0.4 nanoseconds, greater than or equal to about 0.5 nanoseconds, greater than or equal to about 0.7 nanoseconds, greater than or equal to about 0.9 nanoseconds, greater than or equal to about 1.25 nanoseconds, greater than or equal to about 1.5 nanoseconds, greater than or equal to about 2 nanoseconds, etc. and/or less than or equal to about 5 nanoseconds, less than or equal to about 4 nanoseconds, less than or equal to about 3 nanoseconds, less than or equal to about 2.5 nanoseconds, less than or equal to about 2.25 nanoseconds, less than or equal to about 1.75 nanoseconds, less than or equal to about 1 nanoseconds, etc.

As described herein, the distance 45 between a read transducer 30 and a write transducer 40 may be between about 0.5 micrometers to about 10 micrometers. The time that elapses, or occurs, from the read transducer 30 being located over a selected point on the storage medium to when the write transducer 40 is to be located over the same selected point may be between about 1 nanosecond and about 120 nanoseconds. Such time period may be a known value, and as described further herein, will be known as the "read-to-write-transducer delay time period." It is to be understood that this read-to-write-transducer delay time period may depend on multiple factors such as the rotational speed, or velocity, of the storage medium, environmental factors affecting the feedback loop from the read/write transducers to the preamplifier 14 and/or control processor 16, etc., and thus, may be adjusted according to the multiple factors as further described herein.

The time that elapses, or occurs, from the read transducer 30 being located over a selected point on the storage medium to when the write transducer 40 is located over the same selected point, or the read-to-write-transducer delay time period, may be greater than or equal to about 0.5 nanoseconds, greater than or equal to about 0.7 nanoseconds, greater than or equal to about 1 nanoseconds, greater than or equal to about 1.25 nanoseconds, greater than or equal to about 1.5 nanoseconds, greater than or equal to about 1.75 nanoseconds, greater than or equal to about 2 nanoseconds, greater than or equal to about 3 nanoseconds, greater than or equal to about 5 nanoseconds, greater than or equal to about 10 nanoseconds, greater than or equal to about 20 nanoseconds, greater than or equal to about 30 nanoseconds, greater than or equal to about 50 nanoseconds, greater than or equal to about 75 nanoseconds, greater than or equal to about 100 nanoseconds, etc. and/or less than or equal to about 175 nanoseconds, less than or equal to about 150 nanoseconds, less than or equal to about 130 nanoseconds, less than or equal to about 120 nanoseconds, less than or equal to about 110 nanoseconds, less than or equal to about 100 nanoseconds, less than or equal to about 85 nanoseconds, less than or equal to about 65 nanoseconds, less than or equal to about 45 nanoseconds, less than or equal to about 35 nanoseconds, less than or equal to about 25 nanoseconds, less than or equal to about 15 nanoseconds, less than or equal to about 7 nanoseconds, less than or equal to about 4 nanoseconds, etc.

One exemplary process for determining the read-to-write-transducer delay time period (e.g., nanoseconds) may include dividing the distance 45 between a read transducer 30 and a write transducer 40 by the velocity of a storage medium at the target portion 42. The velocity of the storage medium at the target portion 42 may be determined by multiplying the rotations per second by two, by Pi, and by the radial distance to the target portion 42 (e.g., the distance from the center of the storage medium to the target portion 42 along a radial line). For example, if the distance 45 between a read transducer 30 and a write transducer 40 is about 4 micrometers, the rotations per minute of the storage medium is about 7200, and the radial distance to the target portion 42 is about 4.5 centimeters, then the read-to-write-transducer delay time period may be about 117 nanoseconds. Further, for example, if the distance 45 between a read transducer 30 and a write transducer 40 is about 0.5 micrometers, the rotations per minute of the storage medium is about 7200, and the radial distance to the target portion 42 is about 4.5 centimeters, then the read-to-write-transducer delay time period may be about 1.4 nanoseconds.

Thus, a write modification signal 58 based on the read data 32 may be delayed 56 by a selected time period that may be determined to be, or set to, the read-to-write-transducer delay time period minus the total path delay from the read transducer 30 to a preamplifier portion 50 to the write transducer 40. For example, if the read-to-write-transducer delay time period is 40 nanoseconds and the total path delay from the read transducer 30 to a preamplifier portion 50 to the write transducer 40 is 1.5 nanoseconds, the delay 56 may be about 38.5 nanoseconds. In other words, the write modification signal 58 may be delayed, or time offset, so as to align with the corresponding, or appropriate, write data signal 62 to compensate for existing magnetization of the storage medium at the target portion 42 and/or proximate the target portion 42 (e.g., read data units 32 in the target data track 44 or adjacent data tracks 34).

The write modification signal 58, after delay 56, may then be further modified and/or amplified in circuit elements 60 so as to be able to adjust, or modify, the write signal 62. In one or more embodiments, the write modification signal 58 may be an analog modification signal that may increase, decrease, or neither decrease nor increase the amplitude of the write signal 62 over time, which will be further described herein with respect to FIGS. 5-10. In one or more embodiments, the write modification signal 58 may be a digital signal that changes, or affects, the write data unit 41 from the control processor as described further herein. In other embodiments, the write modification signal 58 may be used to change the waveform asymmetry (e.g., difference between negative and positive peaks relative to zero), rise time, total current, overshoot, or any other parameter to counteract, mitigate, and/or compensate for existing magnetization that may be problematic.

The write signal 62 and the write modification signal 58 are depicted as being overlayed in box 65. As shown, the write modification signal 58 has increased a portion of the write signal 62 as shown by the dotted lined portion 64, which indicates the increase to the write signal 62.

In other words, FIG. 4 depicts apparatus, devices, and methods for modifying write current knowing what data is adjacent and/or already on the target track that avoids a write synchronization or buffer. Read data 32 from read transducer 30 4 micrometers ahead of a write transducer 40 may be sent to preamp 50 to be signal conditioned (e.g., integrated, moving averaged, etc.) into an analog signal 58 that can modify the write signal, or current, 62 that will be written onto the target portion 42. Further, a programmable delay could be used to trim to the exact loop-back timing (e.g., a total path delay from the read transducer 30 to preamp 50 to write transducer 40 may be about 1 nanosecond).

It is to be understood that the same or similar processes or methods may be used by the control processor 16 shown in FIG. 2 as opposed to the preamplifier portions 14, 50. In this example, the total path delay from a read transducer to a control processor 16 to a write transducer may be about 2 nanoseconds to about 4 nanoseconds (e.g., 2.3 nanoseconds), and thus, the delay 56 may be similar than when the processes or methods are performed by the preamplifier portion 14, 50. Further, instead of a write current amplification signal as described as an example of a write modification signal 58 with respect to the FIG. 3, the control processor 16 may use, or provide, a digital amplitude modification signal as a write modification signal.

Figure 5:
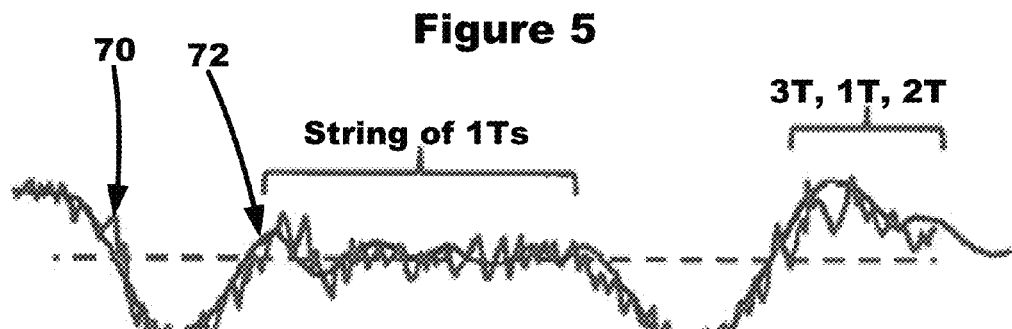
FIG. 5 is a graph depicting an exemplary read data signal over time for use in adjusting a write signal to compensate for existing magnetization of a storage medium.

A graph depicting an exemplary read data signal 70 over time for use in adjusting a write signal to compensate for existing magnetization of a storage medium is shown in FIG. 5. The read data signal 70, in this example, may be provided, or read from, a data portion in an adjacent track to the target portion. Further, as shown, the read data signal 70 may contain, or include, noise, which may be reduced, or removed, to provide a smoothed read data signal 72 (as shown overlaying the read data signal 70).

Figure 6:
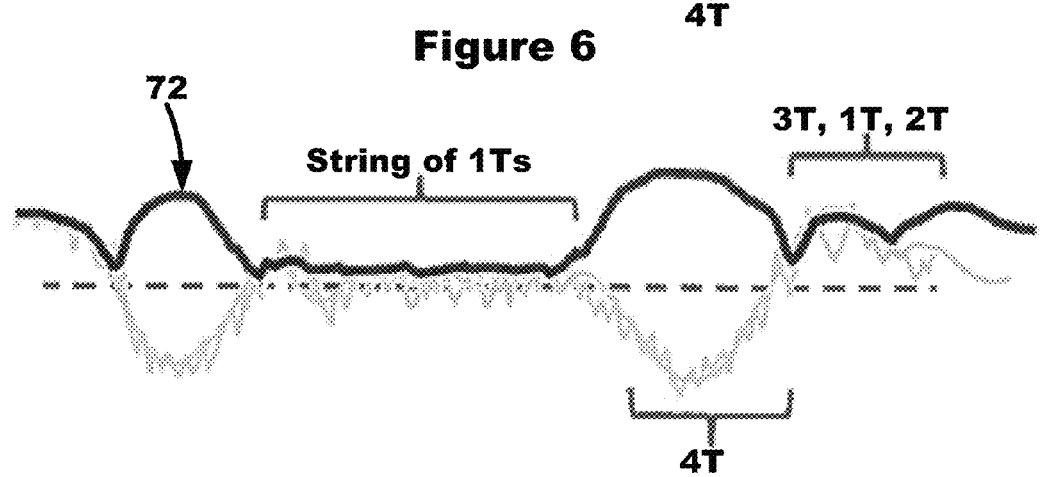
FIG. 6 is a graph depicting the read data signal of FIG. 5 after rectification and smoothing.
Figure 7:
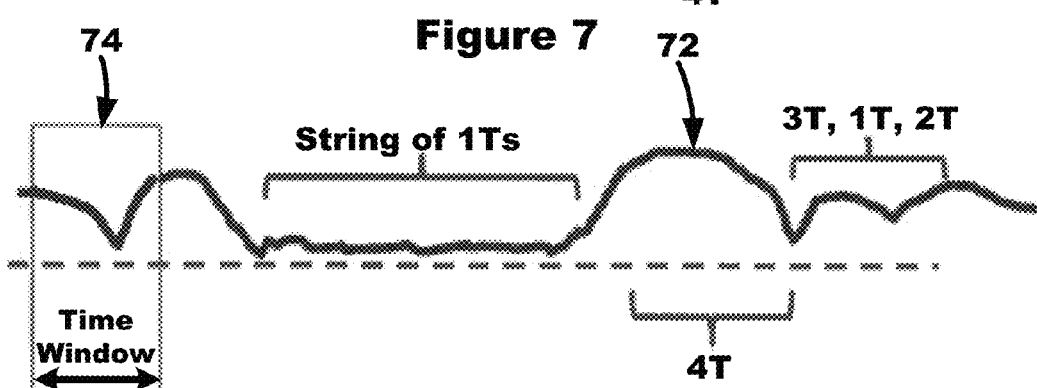
FIG. 7 is a graph depicting the read data signal of FIG. 6 including a moving average window.
Figure 8:
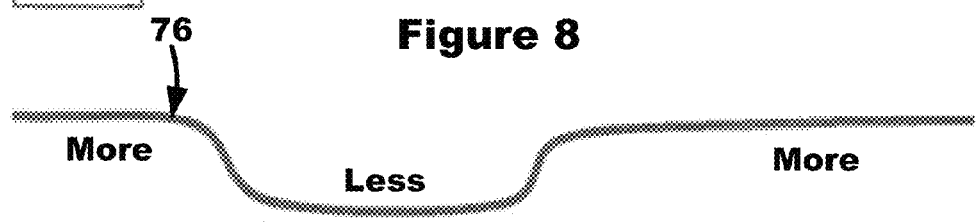
FIG. 8 is a graph depicting a write modification signal based on the read data signal of FIG. 7.

The smoothed read data signal 72 may be rectified as shown in FIG. 6, and then, may be integrated, or time-window averaged, 74 as shown in FIG. 7 to provide a write modification signal 76 as shown in FIG. 8. This exemplary write modification signal 76 may be used as a write current modification signal as will be shown in FIGS. 9-10. Further, as labeled, the write modification signal 76 may generally provide either more, less, or neither current to a write signal.

For example, a write signal 80 is shown modified by the write modification signal 76 in FIG. 9. In particular, the write modification signal 76 increases the write current of the write signal 80 in regions 82 and 84 while either decreasing, or simply not providing an increase, in region 83.

As described herein, more than one read data signal may be acquired, or read, from data portions proximate or near the target portion of the target data track. Each of such more than one read data signal may be used to adjust, or modify, a write signal. In one or more embodiments, the more than one read signal may be combined to form a write modification signal. In one or more embodiments, the more than one read signal may each be transformed, or conditioned, into a write modification signal, and each write modification signal may be applied to the write signal separately or individually.

The exemplary write modification signal 76 is being shown to be combined 91 (e.g., as symbolically depicted as a summer or adder) with additional exemplary write modification signal 90 in FIG. 10. The combined write modification signal 90 may then be used to adjusted, or modify, a write signal. As shown, the adjusted write signal 80 from FIG. 9 is depicted being modified with the additional write modification signal 90 for, e.g., comparison and exemplary purposes. More specifically, at a first region 92, the additional write modification signal 90 increases the amplitude of the adjusted write signal 80 as shown by the signal line 99 and by the "−+," which indicates that the write modification signal 76 provides "less" (e.g., less current to the write signal) while the additional write modification signal 90 provides "more" (e.g., more current to the write signal). Further, at a second region 94, the additional write modification signal 90 increases the amplitude of the adjusted write signal 80 as shown by the signal line 99 and by the "++,"

which indicates that both the write modification signal 76 and additional write modification signal 90 provides "more" (e.g., more current to the write signal).

It may be described that the systems, apparatus, devices, and methods described herein uses one or more read transducers as a real-time feedback into the write subsystem to make smart predictive decisions on the write transducer current. Further, it may be described that the systems, apparatus, devices, and methods described herein may avoid the use of synchronization clock and buffers. In one or more embodiments, the preamp may be used to use read while writing, and may use real-time feedback of read sensor(s) that are on and off the target track to adjust the write current for upcoming bits. In one or more other embodiments, the control processor, or controller, may be used to perform that same, or similar, processes and/or methods.

Further, it may be described that the exemplary methods and processes are advantageous because, e.g., they may use the existing interconnects from the head to the preamp and channel. By activating a mode in the preamp to read while also writing, the read signal may be observed, or sensed, while bits are written. For, use of this read-back signal may be described as using a feedback input to the write signal.

In one embodiment, the preamplifier, or preamplifier portion may be used for direct write modification. In this example, one or more read transducer input signals may be "piped" into a detector that can monitor read-back energy within a programmable time window. This perceived rectified read-back energy in perpendicular recording may be inversely proportional to bit length, and therefore, if the perceived energy is low, the preamplifier may assume that the bits on the media during this time window are primarily small transitions (e.g., small T cell), and if the perceived energy is large, the bits may be assumed to be large T or large string of non-return to zero (NRZ). Using this detector, on unipolar analog signal may be constructed that represents the inverse of the current modification to be applied. Further, it is to be understood that the time window may not necessarily be "bit level" for the analog modification signal to be effective.

In many cases, the read-to-write down-track separation is known in micrometers, and therefore, a nominal delay time in view of storage medium spin-speed may be determined. The read-back, processing, and application of the write current modification may be a mode within this time window to get the track of interest data to the storage medium in an appropriate or corresponding time. Any fine tuning to more exactly align the track of interest pattern with the adjacent track detected may be applied by fractional adjustments in the preamplifier or control processor. Further, the skew dependence and other environmental factors may change the exact delay in the read and write path such that timing adjustment to align the upcoming track of interest write with the adjacent track on the bit or multi bit level may be tuned periodically. In one or more embodiments, the channel and/or preamplifier can be equipped with a programmable fractional delay and the timing can be periodically adjusted via a predetermined lookup table or on in-drive calibration procedure. For example, a test pattern for adjacent and on-track data may be used to test the track of interest and/or adjacent tracks bit error rate (BER) sensitivity vs a delay adjustment. It may be described that preamplifier-based write signal adjustment, or modification, may have the lowest latency since, e.g., it is self-contained within the preamp head signal path, and therefore, may not use additional processors (e.g., digital signal processors, etc.), interconnects, etc. to achieve the write signal adjustment or modification. In one or more embodiments, a communication path latency may be periodically determined as, e.g., described in U.S. Pat. No. 8,687,300 entitled "COMMUNICATION PATH LATENCY MEASUREMENT USING CAPACITIVE COUPLING" and issued on Apr. 1, 2014 and U.S. Pat. No. 7,876,517 entitled "MEASUREMENT OF ROUND TRIP LATENCY IN WRITE AND READ PATHS" and issued on Jan. 25, 2011, each of which are incorporated by reference in their entireties.

In one embodiment, the reader-to-writer (e.g., read transducer to write transducer) separation may be sufficient to "pipe" the read-back signal to the control processor and have the channel make decisions on what bits to modify the write current on. The modifications can be sent back via a separate digital line to the preamplifier portion that is time aligned with the write data sent to the preamplifier portion. Additionally, since the adjacent data pattern is being detected, while the track of interest data pattern is being encoded, both the encoding and pre-compensation could be chosen to best achieve minimal adjacent track interference, erase band minimization, and bit error rate (BER)/areal density capability (ADC).

Further, it may be described that an advantage to this method is the ability to combine the encoding along with the write current modification for the track of interest. Still further, it is to be understood that the read transducer feedback modification of the incoming pattern for the track of interest may not be preferred to the on-track recording of bits within the track of interest, and to compensate for this, traditional pattern dependent write methods that benefit on-track recording can be weighted and summed with the adjacent track.

The methods and/or techniques described in this disclosure, including those attributed to the HDD controller, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in programmers. The term "controller," "module," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, the like, or any combination thereof. The instructions may be executed by one or more processors to support one or more aspects of the functionality described in this disclosure.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g., 1 to 5 includes 1, 1.5, 2, 2.75, 3, 3.80, 4, and 5) and any range within that range.

What is claimed is:

1. A device comprising:
   a storage medium comprising a plurality of data tracks;
   a head comprising a read transducer and a write transducer; and
   circuitry operably coupled to the head to read data from and write data to the plurality of data tracks of the storage medium, the circuitry configured to:
      receive a write data unit to be written to a target portion of a target data track of the storage medium using the write transducer;
      initiate the acquisition of at least one read data signal from at least one of the target portion of the target data track and another portion of the target track or another data track proximate the target portion using the read transducer when the write data unit is received;
      adjust a write data signal corresponding to the write data unit based on the at least one read data signal to compensate for existing magnetization of the storage medium of the target portion or proximate the target portion of the target data track; and
      transmit the adjusted write signal to the write transducer to write the write data unit to the target portion.

2. The device of claim 1, wherein the circuitry comprises:
   a control processor; and
   a preamplifier portion operably coupled to the control processor and the head, wherein the preamplifier portion is configured to adjust the write data signal corresponding to the write data unit based on the at least one read data signal to compensate for existing magnetization of the storage medium of or proximate the target portion of the target data track.

3. The device of claim 1, wherein the circuitry comprises:
   a preamplifier portion operably coupled to the head; and
   a control processor operably coupled to the preamplifier portion, wherein the control processor is configured to adjust the write data signal corresponding to the write data unit based at least on the read data signal to compensate for existing magnetization of the storage medium of or proximate the target portion of the target data track.

4. The device of claim 1, wherein adjusting the write data signal corresponding to the write data unit based on the at least one read data signal comprises:
   creating a write modification signal based on the at least one read data signal; and
   adjusting the write data signal in response to the write modification signal.

5. The device of claim 4, wherein creating a write modification signal based on the at least one read data signal comprises delaying the at least one read data signal by a time interval corresponding to an amount of time that elapses from the read transducer being located over a selected point on the storage medium to when the write transducer is to be located over the selected point on the storage medium.

6. The device of claim 4, wherein creating a write modification signal based on the at least one read data signal comprises delaying the at least one read data signal by a time interval, wherein the time interval is based on at least a distance between the read transducer and the write transducer and a rotational speed of the storage medium.

7. The device of claim 4, wherein creating a write modification signal based on the at least one read data signal comprises delaying the at least one read data signal by a time interval, wherein the time interval is adjusted based on latency between the head and the portion of the circuitry that is adjusting the write data signal corresponding to the write data unit based on the at least one read data signal.

8. The device of claim 4, wherein creating a write modification signal based on the at least one read data signal comprises one or more of rectifying the at least one read data signal; low-pass filtering the at least one read data signal, and calculating a moving average of the at least one read data signal.

9. The device of claim 4, wherein the write modification signal is based on a read data signal from the target portion of the target data track and another portion of another data track proximate the target portion.

10. A method comprising
    receiving a write data unit to be written to a target portion of a target data track of a storage medium of a storage device;
    initiating the reading of at least one read data signal from at least one of the target portion of the target data track and another portion of the target track or another data track proximate the target portion when the write data unit is received;
    adjusting a write data signal corresponding to the write data unit based on the at least one read data signal to compensate for existing magnetization of the storage medium of the target portion or proximate the target portion of the target data track; and
    writing the write data unit to the target portion based on the adjusted write signal.

11. The method of claim 10, wherein adjusting a write data signal corresponding to the write data unit based on the at least one read data signal is performed in a preamplifier portion of the storage device.

12. The method of claim 10, wherein adjusting a write data signal corresponding to the write data unit based on the at least one read data signal is performed in a control processor of the storage device.

13. The method of claim 10, wherein adjusting the write data signal corresponding to the write data unit based on the at least one read data signal comprises:

creating a write modification signal based on the at least one read data signal; and adjusting the write data signal in response to the write modification signal.

14. The method of claim 13, wherein creating a write modification signal based on the at least one read data signal comprises delaying the at least one read data signal by a time interval corresponding to an amount of time that elapses from a read transducer of a head of the storage device being located over a selected point on the storage medium to when a write transducer of the head is to be located over the selected point on the storage medium.

15. The method of claim 13, wherein creating a write modification signal based on the at least one read data signal comprises delaying the at least one read data signal by a time interval, wherein the time interval is based on at least a distance between a read transducer and a write transducer on a head of the storage device and a rotational speed of the storage medium.

16. The method of claim 13, wherein creating a write modification signal based on the at least one read data signal comprises delaying the at least one read data signal by a time interval, wherein the time interval is adjusted based on latency between a head of the storage device and a portion of the storage device that is adjusting the write data signal corresponding to the write data unit based on the at least one read data signal.

17. The method of claim 13, wherein creating a write modification signal based on the at least one read data signal comprises one or more of rectifying the at least one read data signal, low-pass filtering the at least one read data signal, and calculating a moving average of the at least one read data signal.

18. The method of claim 13, wherein the write modification signal is based on a read data signal from the target portion of the target data track and another portion of another data track proximate the target portion.

19. Apparatus comprising:
a storage medium comprising a plurality of data tracks; and
circuitry operably to read data from and write data to the plurality of data tracks of the storage medium, the circuitry configured to:
receive a write data unit to be written to a target portion of a target data track of the storage medium;
determine a write modification signal based on at least one read data signal from at least one of a target portion of the target data track and another portion of the target track or another data track proximate the target portion when the write data unit is received; and
adjust a write data signal based on the write modification to compensate for existing magnetization of the storage medium of the target portion or proximate the target portion of the target data track.

20. The apparatus of claim 19, wherein the circuitry is further configured to delay the modification signal by a time interval, wherein the time interval is based on at least a distance between read and write transducers of a head configured read data from and write data to the storage medium.

* * * * *